(12) United States Patent
Peters

(10) Patent No.: US 9,309,834 B2
(45) Date of Patent: Apr. 12, 2016

(54) LINER HANGER CABLE

(75) Inventor: Donald W. Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 787 days.

(21) Appl. No.: 13/484,837

(22) Filed: May 31, 2012

(65) Prior Publication Data

US 2013/0319007 A1    Dec. 5, 2013

(51) Int. Cl.
*F02C 7/20* (2006.01)
*F02K 1/82* (2006.01)
*F01D 25/28* (2006.01)
*B64D 27/26* (2006.01)

(52) U.S. Cl.
CPC ............... *F02K 1/822* (2013.01); *B64D 27/26* (2013.01); *F01D 25/28* (2013.01); *F02C 7/20* (2013.01); *B64D 2027/266* (2013.01); *Y02T 50/675* (2013.01); *Y10T 29/49229* (2015.01)

(58) Field of Classification Search
CPC .... F02C 7/20; B64D 27/26; B64D 2027/268; B64D 2027/266; F01D 25/28; F02K 1/82
USPC ............... 60/796, 797, 262, 798, 799; 244/54
See application file for complete search history.

(56) References Cited

U.S. PATENT DOCUMENTS

| | | | |
|---|---|---|---|
| 3,826,088 A | 7/1974 | Nash et al. | |
| 4,864,818 A | 9/1989 | Taylor | |
| 5,059,055 A | 10/1991 | DeGress et al. | |
| 5,088,279 A * | 2/1992 | MacGee | 60/226.1 |
| 5,319,922 A * | 6/1994 | Brantley | 60/797 |
| 5,417,056 A | 5/1995 | Johnson et al. | |
| 7,017,334 B2 | 3/2006 | Mayer et al. | |
| 7,089,748 B2 | 8/2006 | Tiemann | |
| 7,581,399 B2 | 9/2009 | Farah et al. | |
| 7,658,061 B2 | 2/2010 | Kawamoto et al. | |
| 7,721,522 B2 | 5/2010 | Farah et al. | |
| 7,861,535 B2 | 1/2011 | Figueroa et al. | |
| 7,866,158 B2 * | 1/2011 | Murphy | 60/770 |
| 7,975,488 B2 | 7/2011 | Farah et al. | |
| 2007/0158527 A1 | 7/2007 | Farah et al. | |
| 2008/0022689 A1 | 1/2008 | Farah et al. | |
| 2009/0293498 A1 | 12/2009 | Petty et al. | |
| 2011/0016879 A1 | 1/2011 | Farah et al. | |

OTHER PUBLICATIONS

International Preliminary Report on Patentability for International Application No. PCT/US2013/041755 mailed Dec. 11, 2014.
International Search Report and Written Opinion for PCT Application No. PCT/US2013/041755 mailed on Aug. 27, 2013.

* cited by examiner

*Primary Examiner* — Steven Sutherland
(74) *Attorney, Agent, or Firm* — Carlson, Gaskey & Olds, P.C.

(57) ABSTRACT

A liner for a gas turbine engine includes a liner defining an inner surface exposed to exhaust gases and a duct spaced radially outward of the liner. A plurality of hanger assemblies is disposed within the radial space between the liner and the duct for supporting the liner relative to the duct. Each of the hanger assemblies includes a cable having a first end attached to the duct and a second end attached to the liner.

18 Claims, 2 Drawing Sheets

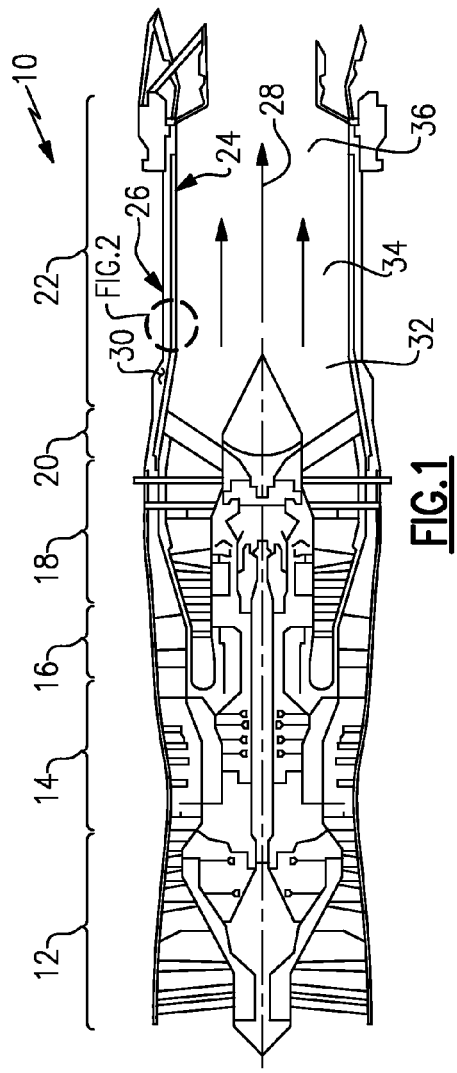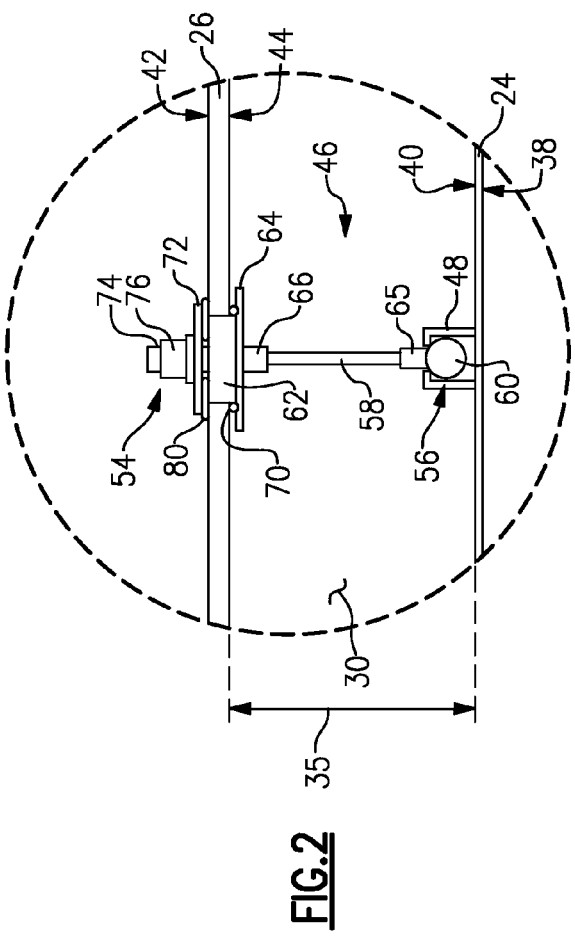

LINER HANGER CABLE

BACKGROUND

A gas turbine engine typically includes a fan section, a compressor section, a combustor section, a turbine section, and in some configurations an augmenter section. A liner extending aft of the turbine section typically referred to as an exhaust or augmenter liner includes an inner liner exposed to hot exhaust gases. The inner liner is typically spaced from an outer structure with a plurality of hanger assemblies. The hanger assemblies are required to accommodate misalignment, complex shapes, large thermal growth differentials, significant pressure loads and high temperatures. Moreover, the hangers are positioned within a confined physical envelope that is difficult to access while accommodating relative movement within several planes simultaneously.

Accordingly, it is desirable to design and develop a reduced cost hanger that performs as desired in the harsh environment of the exhaust duct while also simplifying assembly and reducing cost.

SUMMARY

A liner assembly for a gas turbine engine according to an exemplary embodiment of this disclosure, among other possible things includes a liner defining an inner surface exposed to exhaust gases, a duct spaced radially outward of the liner, and a hanger assembly supporting the liner relative to the duct, the hanger assembly including a cable having a first end attached to the duct and a second end attached to the liner.

A further embodiment of the foregoing liner assembly, wherein the first end comprises a fastening member.

A further embodiment of any of the foregoing liner assemblies, wherein the first end includes an insert for preventing rotation that is received within an opening of the liner.

A further embodiment of any of the foregoing liner assemblies, wherein the insert includes a collar surrounding a portion of the cable, the collar including an inner surface tapered inwardly to accommodate movement of the cable relative to the insert.

A further embodiment of any of the foregoing liner assemblies, including a seal disposed between the insert and the liner.

A further embodiment of any of the foregoing liner assemblies, wherein the second end comprises a ball received within a mount on the liner.

A further embodiment of any of the foregoing liner assemblies, wherein the liner includes a mount defining a seat receiving the ball.

A gas turbine engine according to an exemplary embodiment of this disclosure, among other possible things includes a fan section including a plurality of fan blades rotatable about an axis, a compressor section in communication with the fan section, a combustor in fluid communication with the compressor section, a turbine section in fluid communication with the combustor and driving the fan section and the compressor section, and an exhaust liner aft of the turbine section, the exhaust liner including a liner defining an inner surface exposed to exhaust gases, a duct spaced radially outward of the liner, and a hanger assembly supporting the liner relative to the duct, the hanger assembly including a cable having a first end attached to the duct and a second end attached to the liner.

A further embodiment of the foregoing gas turbine engine, wherein the second end comprises a ball received within a mount on the liner.

A further embodiment of any of the foregoing gas turbine engines, wherein the first end comprises a fastening member secured to the duct with a fastener.

A hanger assembly according to an exemplary embodiment of this disclosure, among other possible things includes a first end attachable to a support structure, a second end distal from the first end, the second end attachable to a liner, and a cable extending between the first end and the second end.

A further embodiment of the foregoing hanger assembly, wherein the first end comprises a fastening member secured to the cable.

A further embodiment of any of the foregoing hanger assemblies, wherein the first end includes an insert for preventing rotation that is received within an opening of the liner.

A further embodiment of any of the foregoing hanger assemblies, wherein the insert includes a collar surrounding a portion of the cable, the collar including an inner surface tapered inwardly to accommodate movement of the cable relative to the insert.

A further embodiment of any of the foregoing hanger assemblies, including a seal disposed between the insert and the liner.

A further embodiment of any of the foregoing hanger assemblies, wherein the second end comprises a ball received within a mount on the liner.

A further embodiment of any of the foregoing hanger assemblies, wherein the liner includes a pocket defining a seat receiving the ball.

A method of supporting a liner of a gas turbine engine according to an exemplary embodiment of this disclosure, among other possible things includes securing a first end of a cable to a liner and securing a second end of the cable to a support structure.

A further embodiment of the foregoing method, wherein the first end comprises a ball and the ball is received within a seat defined on the liner.

A further embodiment of any of the foregoing methods, wherein the second end comprises an insert and the insert is received within an opening of the support structure.

These and other features disclosed herein can be best understood from the following specification and drawings, the following of which is a brief description.

BRIEF DESCRIPTION OF THE DRAWINGS

FIG. 1 is a schematic view of an example gas turbine engine.

FIG. 2 is a cross section of an example hanger assembly.

DETAILED DESCRIPTION

Figure 3:
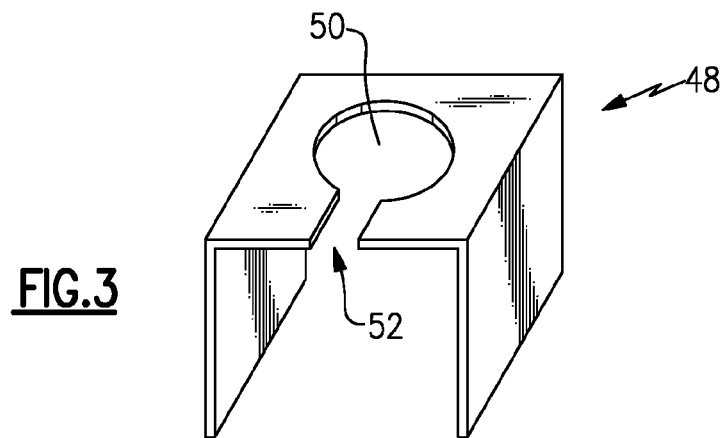
FIG. 3 is a perspective view of an example seat mounted to an example liner assembly.

Referring to FIGS. 1 and 2, an example gas turbine engine 10 includes a fan section 12, a compressor section 14, a combustor section 16, and a turbine section 18. Air entering the fan section 12 is initially compressed before entering the compressor section 14. A portion of air entering the engine 10 flows through a bypass duct and a portion proceeds to the compressor section to the engine core. The compressor section 14 further compresses the air and communicates that air to the combustor section 16. In the combustor section 16, the compressed air is mixed with fuel and ignited to generate a hot stream of exhaust gasses 28. The exhaust gasses are expanded through a turbine section 18 that in turn drives the compressor section 14 and fan section 12. The example gas turbine engine 10 includes an augmenter section 20 where fuel can be mixed with the hot exhaust gasses 28 and ignited to create additional thrust. Aft of the augmenter section 20 is an exhaust liner assembly 22.

The example exhaust liner assembly 22 includes a first section 32, a second section 34, and a third section 36 that are all movable relative to each other to preferentially direct exhaust gasses 28. As appreciated, although the example exhaust liner 22 includes multiple sections, the exhaust liner 22 may also include only one section. Each section of the example exhaust liner assembly 22 includes an inner liner 24 that is supported radially inward of duct 26. The inner liner 24 is exposed to the high temperature exhaust gases 28 on a radially inward facing hot side 38 and to cooling airflow on a radially outward facing cold side 40. An annular channel 30 is defined in the radial space between the duct 26 and liner 24 that receives bypass airflow that provides cooling air flow for the liner 24. As appreciated, the specific structure of the example exhaust liner assembly 22 is illustrated by way of example, and other exhaust liner assembly configurations are within the contemplation of this disclosure.

The liner 24 experiences high temperatures on a hot side 38 (FIG. 2) due to its exposure to the exhaust gasses 28. Accordingly, the annular channel 30 disposed between the liner 24 and the duct 26 is filled with cooling air. The spaced apart orientation between the liner 24 and duct 26 is provided by a plurality of hanger assemblies 46.

Referring to FIG. 2, the plurality of hanger assemblies 46 are disposed annularly at circumferentially and axially spaced intervals between the duct 26 and the liner 24. The hanger assemblies 46 provide for maintaining a desired radial distance 35 between the liner 24 and duct 26. The example hanger assembly 46 comprises a first end 54 that is attached to the duct 26 and a second end 56 that is attached to the liner 24.

A plurality of hanger assemblies 46 is disposed about the circumference of the exhaust liner assembly 22 to provide the desired radial spacing therebetween. The disclosed hanger assemblies 46 include a cable 58 that extends between the first end 54 and the second end 56. The cable 58 operates in tension only. Accordingly, a hanger 46 on one side of the exhaust liner 26 will be in tension against another hanger assembly on a radially opposite side of the exhaust liner assembly 22 such that all of the hanger assemblies 46 remain in tension to provide the desired position and restraint of the liner 24. Moreover, a pressure within the annular passage 30 is greater than a pressure of the exhaust gases 28 which further aids in maintaining tension on the cable 58.

The first end 54 of the hanger assembly 46 includes an externally threaded surface 74 that corresponds with a fastening member 76. In this example, the fastening member comprises a nut 76 that is threadingly received onto the first end 54. The first end 54 includes an insert 62. The example insert 62 includes a flange 64 and a collar portion 66 extending longitudinally in a direction common with the cable 58.

Referring to FIG. 3, with continued reference to FIG. 2, the example hanger assembly 46 includes a ball 60 disposed at the second end 56 that is received within a liner mount 48. The example liner mount 48 includes a seat 50 that corresponds to the circumference of the ball 60. A slot 52 is in communication with the seat 50 and allows for the cable 58 to slide therethrough such that the ball 60 can be seated on an inner surface of the seat 50.

Figure 4:
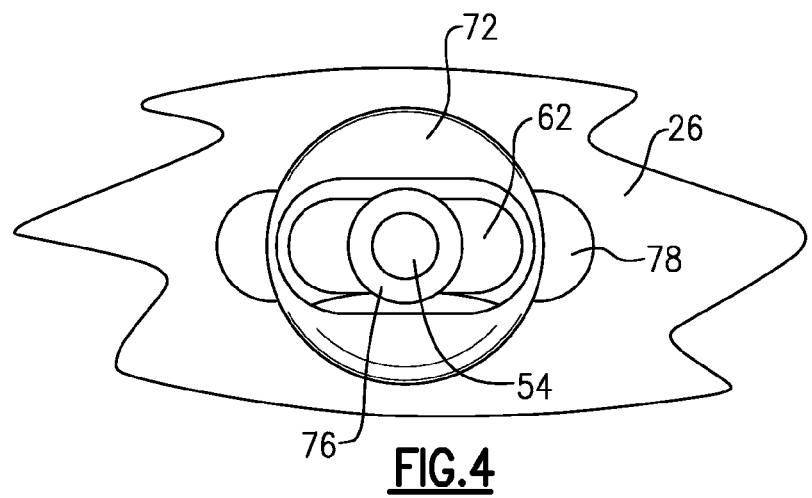
FIG. 4 is a top view of a first end of the example hanger assembly.
Figure 5:
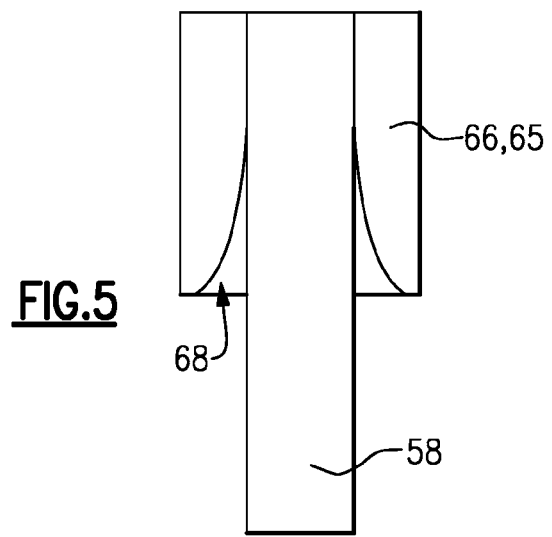
FIG. 5 is an enlarged cross section of a connection between an example cable and an end of the example hanger.

Referring to FIGS. 4 and 5 with continued reference to FIG. 2, the example insert 62 includes an oval shape that corresponds with an oval opening 78 within the duct 26. The oval shaped insert 62 and corresponding opening 78 allows for the nut 76 to be threaded on to the end 54 without causing a rotation of the cable 58 and thereby the ball 60 within the liner mount 48. Accordingly, the shape of the insert 62 provides an anti-rotation feature to allow for the fastening member 76 to be received and attached to the first end 54.

The insert 62 includes collar 66 and the ball 60 includes collar 65 through which the cable 58 extends. The example cable 58 is crimped or swedged onto the ball 60 at the second end 56 and onto the insert 62 at the first end 54. Ends of the cable 58 are attached to the insert 62 on the first end and to the ball 60 on the second end.

Referring to FIG. 5, both the ball collar 65 and the insert collar 66 include a tapered inner surface 68. The tapered inner surface 68 provides and accommodates linear movement of the cable 58 by eliminating sharp edges that contact the cable 58 as the duct 26 and liner 24 moves relative to each other in any direction.

Referring to FIG. 2 with continued reference to FIGS. 3 and 4, the example hanger assembly 46 is assembled within the exhaust liner 22 to support the liner 24 relative to the duct 26 but first extending the second end 56 and thereby the ball 60 through the opening 78 within the duct 26. The second end 56 is then inserted into the liner mount 48 to attach the second end 56 to the liner 24. In this example, the second end 56 includes the ball 60 that is received within a liner mount 48. The ball 60 is received within the liner mount 48 by sliding the cable 58 through the slot 52. The ball 60 is then able to seat against an inner surface of the seat 50 that forms the seat within the liner mount 48.

Once the ball 60 of the second end 56 is attached to the liner mount 48, the first end 54 is pulled upwardly by fastening the nut 76. Prior to the nut 76 being inserted onto the first end 54, a washer 72 is inserted over the insert 62. The example washer 72 includes an inner opening that is oval and corresponds with the shape of the insert 62. A seal 70 may be disposed between a flange 64 of the insert and a bottom surface 44 of the duct 26.

The top surface 42 of the duct 26 is the side on which the nut 76 is accessible and on which a desired tension can be applied to the cable 58 to maintain a desired spacing between the liner 24 and the duct 26. The seal 70 prevents leakage of cooling air passing through the annular channel 30. The radial distance between the liner 24 and the duct 26 is set by the length between the first end 54 and the second end 56 that is provided by tightening the nut 76. If required, a shim 80 as is indicated in FIG. 2 may be utilized to further provide an adjustment to the length and tension applied by the hanger assembly 46.

Accordingly, the example hanger assembly 46 provides a simple easy to install hanger assembly that eliminates complex castings while providing the desired strength and adjustability for assembling an exhaust liner assembly.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A liner assembly for a gas turbine engine comprising:
   a liner disposed about an engine axis, the liner defining an inner surface exposed to exhaust gases;
   a duct spaced radially outward of the liner; and
   a hanger assembly supporting the liner relative to the duct, the hanger assembly including a cable extending transverse to the engine axis and having a first end attached to the duct and a second end attached to the liner, wherein the cable restricts relative radial movement between the liner and duct along a longitudinal length of the cable in only one direction.

2. The liner assembly as recited in claim 1, wherein the first end comprises a fastening member.

3. The liner assembly as recited in claim 2, wherein the first end includes an insert for preventing rotation that is received within an opening of the duct.

4. The liner assembly as recited in claim 3, wherein the insert includes a collar surrounding a portion of the cable, the collar including an inner surface tapered inwardly to accommodate movement of the cable relative to the insert.

5. The liner assembly as recited in claim 3, including a seal disposed between the insert and the duct.

6. The liner assembly as recited in claim 1, wherein the second end comprises a ball received within a mount on the liner.

7. The liner assembly as recited in claim 6, wherein the liner includes the mount defining a seat receiving the ball.

8. A gas turbine engine comprising:
- a fan section including a plurality of fan blades rotatable about an axis;
- a compressor section in communication with the fan section;
- a combustor in fluid communication with the compressor section;
- a turbine section in fluid communication with the combustor and driving the fan section and the compressor section; and
- an exhaust liner aft of the turbine section, the exhaust liner including a liner defining an inner surface exposed to exhaust gases, a duct spaced radially outward of the liner; and
- a hanger assembly supporting the liner relative to the duct, the hanger assembly including a cable having a first end attached to the duct and a second end attached to the liner, wherein the hanger assembly restrains relative radial movement between the liner and duct in only one direction along a longitudinal length of the cable.

9. The gas turbine engine as recited in claim 8, wherein the second end comprises a ball received within a mount on the liner.

10. The gas turbine engine as recited in claim 8, wherein the first end comprises a fastening member secured to the duct with a fastener.

11. A hanger assembly for supporting a liner of a gas turbine engine comprising:
- a first end attachable to a support structure;
- a second end distal from the first end, the second end attachable to a liner; and
- a cable extending transverse to an engine longitudinal axis between the first end and the second end, the second end including a ball received within a mount on the liner, wherein the cable restrains relative movement of the liner relative to the support structure in one direction along a longitudinal length of the cable.

12. The hanger assembly as recited in claim 11, wherein the first end comprises a fastening member secured to the cable.

13. The hanger assembly as recited in claim 12, including the first end includes an insert for preventing rotation that is received within an opening of the support structure.

14. The hanger assembly as recited in claim 13, wherein the insert includes a collar surrounding a portion of the cable, the collar including an inner surface tapered inwardly to accommodate movement of the cable relative to the insert.

15. The hanger assembly as recited in claim 13, including a seal disposed between the insert and the duct.

16. The hanger assembly as recited in claim 11, wherein the mount includes a pocket defining a seat receiving the ball.

17. A method of supporting a liner of a gas turbine engine comprising:
- securing a first end of a cable to the liner transverse to an engine longitudinal axis; and
- securing a second end of the cable to a support structure, wherein the first end comprises a ball and the ball is received within a seat defined on the liner.

18. The method as recited in claim 17, wherein the second end comprises an insert and the insert is received within an opening of the support structure.

* * * * *